(12) United States Patent
Riveros Saavedra et al.

(10) Patent No.: US 10,845,091 B2
(45) Date of Patent: Nov. 24, 2020

(54) ELLIPTICAL CYLINDER COLLECTOR FOR SOLAR THERMAL ENERGY

(71) Applicant: Universidad Nacional de Itapua, Itaipua (PY)

(72) Inventors: Waldy Anibal Riveros Saavedra, Pilar Neembucu (PY); Ricardo Hideto Matsunaga Masaoka, Le Paz-Itapua (PY); Fernando Luis Galeano Flores, Hohenau-Itapua (PY); Sandra Isabel Kallus Lobsiger, Bella Vista-Itapua (PY)

(73) Assignee: UNIVERSIDAD NACIONAL DE ITAPUA, Itaipua (PY)

( * ) Notice: Subject to any disclaimer, the term of this patent is extended or adjusted under 35 U.S.C. 154(b) by 208 days.

(21) Appl. No.: 16/030,525

(22) Filed: Jul. 9, 2018

(65) Prior Publication Data
US 2019/0353404 A1    Nov. 21, 2019

(30) Foreign Application Priority Data

May 17, 2018  (PY) ..................................... 1836509

(51) Int. Cl.
*F24S 23/70*     (2018.01)
*F24S 10/20*     (2018.01)
*F24S 50/20*     (2018.01)
*F24S 30/425*    (2018.01)

(52) U.S. Cl.
CPC ............... *F24S 23/70* (2018.05); *F24S 10/20* (2018.05); *F24S 30/425* (2018.05); *F24S 50/20* (2018.05); *F24S 2023/83* (2018.05)

(58) Field of Classification Search
CPC ........ F24S 10/20; F24S 23/70; F24S 2023/83; F24S 50/20
See application file for complete search history.

(56) References Cited

U.S. PATENT DOCUMENTS

| | | | |
|---|---|---|---|
| 4,359,041 A * | 11/1982 | Snodgrass | F24S 30/425 126/608 |
| 5,771,878 A | 6/1998 | Lewis et al. | |
| 6,886,581 B2 | 5/2005 | Harniet | |
| 7,240,675 B2 | 7/2007 | Eickhoff | |
| 8,303,124 B2 | 11/2012 | O'Connor et al. | |
| 8,327,838 B1 * | 12/2012 | Ochadlick | F24S 50/20 126/572 |
| 9,773,934 B2 * | 9/2017 | Wheelwright | H02S 40/22 |
| 9,920,956 B2 * | 3/2018 | Kuckelkorn | F24S 23/74 |
| 10,208,984 B2 * | 2/2019 | Abdel-Hady | F24S 40/85 |
| 10,514,186 B2 * | 12/2019 | Leberer | F24S 80/30 |
| 10,541,643 B2 * | 1/2020 | Knox | H02S 20/30 |

(Continued)

*Primary Examiner* — Edelmira Bosques
*Assistant Examiner* — Nikhil P Mashruwala
(74) *Attorney, Agent, or Firm* — Lucas & Mercanti, LLP

(57) ABSTRACT

Elliptical cylinder collector for thermal solar energy comprising a first pipe and a reflector surface, which also comprises a second pipe and a third pipe, wherein the reflector surface has a generatrix which is half an ellipse and wherein the second pipe and the third pipe are located at focal points of the ellipse and the first pipe is located on a minor axis of the ellipse at a greater distance from the reflector surface than the second pipe and the third pipe, the first pipe is also located at the focal point of an imaginary parabola whose vertex is located at the negative end of the minor axis of the ellipse.

6 Claims, 2 Drawing Sheets

(56) References Cited

U.S. PATENT DOCUMENTS

| | | | |
|---|---|---|---|
| 10,584,900 B2* | 3/2020 | von Behrens | F24S 20/20 |
| 2009/0056704 A1* | 3/2009 | Donati | F24S 23/74 |
| | | | 126/694 |
| 2014/0182578 A1* | 7/2014 | Fortin | F24S 30/425 |
| | | | 126/600 |
| 2018/0067292 A1* | 3/2018 | Noble | G02B 19/0023 |
| 2018/0120546 A1* | 5/2018 | Chan | G02B 19/0042 |

* cited by examiner

ELLIPTICAL CYLINDER COLLECTOR FOR SOLAR THERMAL ENERGY

CROSS REFERENCE TO RELATED APPLICATION

This application claims priority of Paraguay Application No. P 1836509 PY filed May 17, 2018, application which is incorporated herein by reference.

FIELD OF THE INVENTION

The invention relates to an elliptical cylinder collector which absorbs solar thermal energy and increases the temperature of a fluid, improving the efficiency of the collectors known in the prior art. The collector object of the invention is applicable to the industry of renewable energy, specifically the industry of solar thermal energy at low and medium temperature.

BACKGROUND OF THE INVENTION

At present, solar thermal energy is experiencing development and significant implementation since legislation requires new buildings to have a solar thermal energy production system.

There are two types of collectors for capturing solar energy, according to the application for which the collector is used, whether the capturing of solar thermal energy is for heating water, the solar collectors are flat and there are various models; if the capturing of solar thermal energy is for generating electric energy, the solar collectors are normally of the parabolic cylinder type.

The flat collectors are very widely used for heating water, being located on buildings, arranged horizontally or inclined and they basically have a series of pipes which capture the solar energy by radiation. The specific concentration on one of the pipes is not intended in these collectors.

The parabolic collectors are also constructed in different shapes, one of which is presented in the document U.S. Pat. No. 7,240,675 dated July 2007 and in the document U.S. Pat. No. 8,303,124 dated November 2012 which use a reflector to concentrate the reflected solar rays on a pipe such that the pipe is located at the focal point of a parabola which is the generatrix of a cylindrical surface.

There are also collectors which have a movable pin like the one which is disclosed in document U.S. Pat. No. 5,771,878 dated June 1998. There are knobs which have valves with a thermoelectric security device such as the one which is disclosed in the document U.S. Pat. No. 6,886,581 dated May 2005, but it does not consider the knob locking, but rather reduces the size of this type of valve, improving its internal mechanism.

This geometric arrangement allows the heated fluid flowrate to be increased and the available space utilized. They can be used to heat water for sanitary use, both domestic and industrial (for example, preheating water for boilers), as well as for heating fluids for use in solar power plants which use water vapor in the vapor turbines.

The main object of this invention is to increase the utilization of solar thermal energy by means of focusing the capturing and reducing space for the placement of the collectors, by circulation rate, according to the energy requirements of the project.

DESCRIPTION OF THE INVENTION

The object of the invention is an elliptical cylinder collector for solar thermal energy comprising a first pipe and a reflector surface, also comprising a second pipe and a third pipe where the reflector surface has a generatrix which is half an ellipse and where the second pipe and the third pipe are located at focal points of the ellipse and the first pipe is located on a minor axis of the ellipse at a greater distance from the reflector surface than the second pipe and the third pipe.

In order to finish defining the geometric position of the pipes, the first pipe is located at the focal point of a parabola whose vertex would be the same as the negative end of the minor axis of the ellipse.

The elliptical cylinder collector for solar thermal energy object of the invention comprises two end bars at each end of the reflector surface supporting the first pipe and a secondary bar fixed to each end bar supporting the second pipe and the third pipe.

The reflector surface in the elliptical cylinder collector for solar thermal energy object of the invention comprises reflective material.

The elliptical cylinder collector for solar thermal energy object of the invention comprises at least two union elbows joining the pipes together at ends of the same.

The elliptical cylinder collector for solar thermal energy object of the invention comprises a static support and a bolt for weekly or monthly adjustment which can vary the angle of inclination of the reflector surface.

The elliptical cylinder collector for solar thermal energy object of the invention, in another embodiment, comprises an electronic control system for carrying out the daily solar tracking on an axis.

Figure 1:
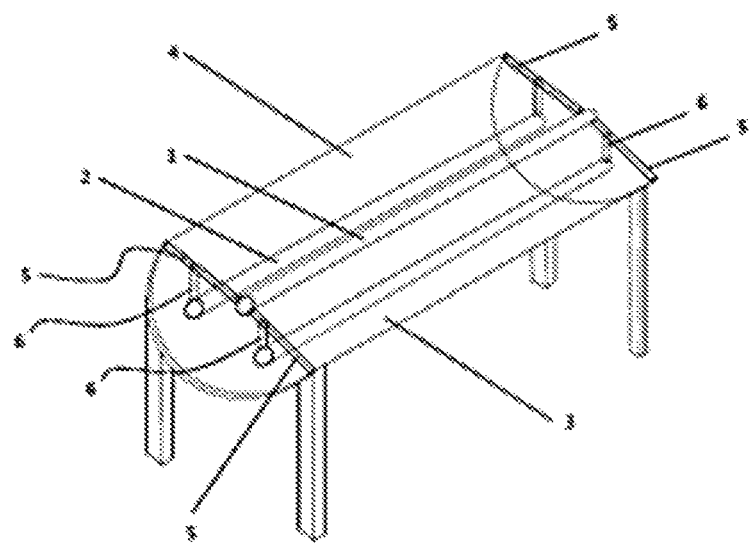
FIG. 1 shows a perspective view of the thermal solar collector object of the invention.
Figure 2:
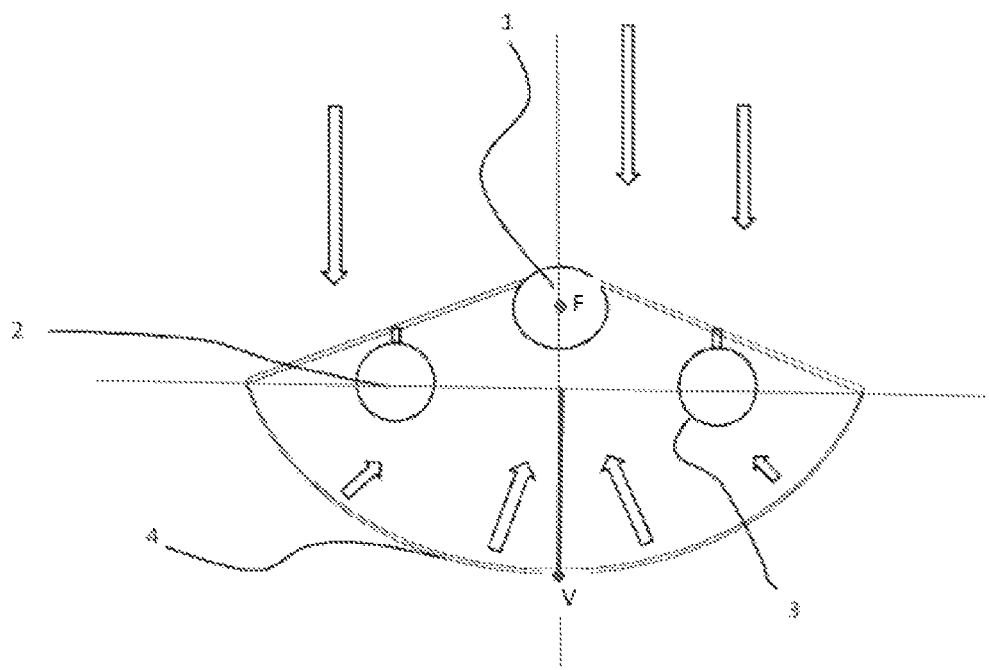
FIG. 2 shows a transversal sectional view of the thermal solar collector object of the invention.
Figure 3:
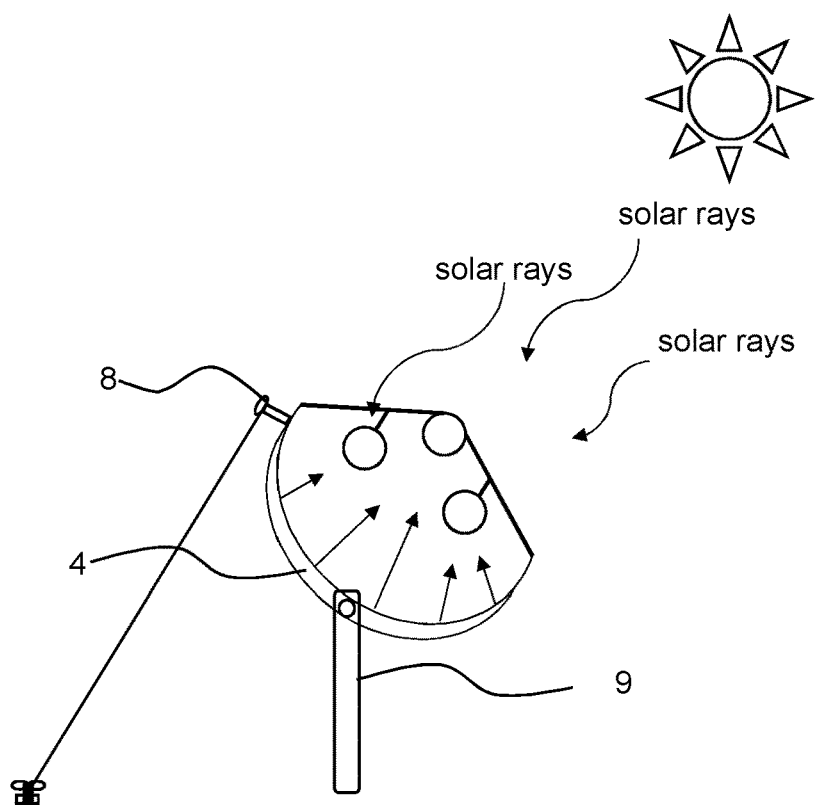
FIG. 3 shows a transversal sectional view of the thermal solar collector object of the invention showing a static support.
Figure 4:
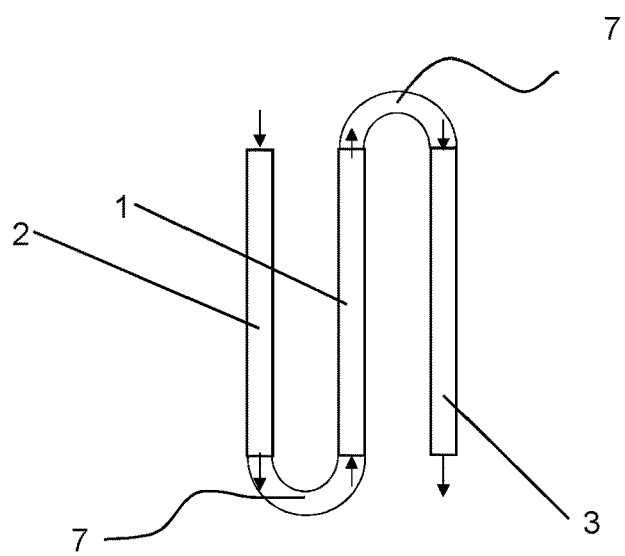
FIG. 4 shows a view of the joining in series by means of elbows of the three pipes of the thermal solar collector object of the invention.

The different reference numerals reflected in the figures correspond to the following elements:
1. first pipe,
2. second pipe,
3. third pipe,
4. reflector surface,
5. end bar,
6. secondary bar,
7. union elbow,
8. static support and
9. adjustment bolt.

DETAILED DESCRIPTION OF THE INVENTION

The present invention relates to an elliptical cylinder collector for solar thermal energy comprising a first pipe (1), a second pipe (2) and a third pipe (3) which are supported by a reflector surface (4) whose generatrix is half an ellipse.

The first pipe (1) is located on the minor axis of the ellipse which is also the focal point of an imaginary parabola with a vertex located at the negative end of the minor axis and the second pipe (2) and the third pipe (3) are located at the focal points of the ellipse. The position of the first pipe (1) on the minor axis of the ellipse is at a greater distance from the reflector surface (4) than the first pipe (1) and the second pipe (2).

In order to finish defining the geometric position of the pipes (1, 2, 3), the first pipe (1) is located at the focal point of a parabola whose vertex would be the same as the negative end of the minor axis of the ellipse.

The reflector surface (4) allows the capturing of solar energy and the subsequent reflection of the rays reflected towards the pipes (1, 2, 3).

The reflector surface (4) is made of reflective material to allow for the reflection of the solar rays towards the pipes (1, 2, 3).

The first pipe (1) is supported at the ends of the reflector surface (4) owing to two end bars (5) which are soldered to the reflector surface (4) itself, while the second and third pipes (2, 3) are each supported by a secondary bar (6), each secondary bar (6) being fixed to an end bar (5) at each side of the first pipe (1) such that there is stability and the deformation by separation of the reflector surface (4) and the first pipe (1) is avoided.

The geometry of the collector object of the invention means that the rays that do not impact on the first pipe (1) impact on the second pipe (2) or on the third pipe (3) and the rays that do not impact on any of them are reflected on the reflector surface (4), meaning that the majority of the rays end up impacting on one of the three pipes (1, 2, 3) of the collector object of the invention.

The circulation of the fluid through the pipes (1, 2, 3) can be implemented in series or in parallel if the circulation is carried out in parallel, the fluid enters the three pipes (1, 2, 3) at the same time, the increase of the temperature is produced in the pipes (1, 2, 3) from one end to another, while if the circulation is carried out in series, the fluid enters first in one pipe, for example the second pipe (2) and from this pipe passes to the following one by means of a union elbow (7), for example, to the first pipe (1) and then passes by means of another union elbow (7) to the last pipe, for example the third pipe (3), in this case the greater temperature is at the end of the route of the fluid along the three pipes (1, 2, 3).

The materials used withstand both the maximum working pressures and the temperatures according to the use of the collector.

The collector object of the invention can carry out the solar capturing statically or movably. If solar capturing is carried out statically, the collector object of the invention comprises a static support (8) for the thermal solar collector and an adjustment bolt (9) for adjusting the angle of inclination of the reflector surface (4) such that the adjustment can be carried out according to the optimal angles for the characteristic days of each month, considering the solar noon.

If solar capturing is carried out movably, the collector object of the invention comprises an electronic control system (not represented in the figures) which carries out the daily solar tracking on an axis.

The invention claimed is:

1. An elliptical cylinder collector for thermal solar energy comprising:
    a first pipe;
    a reflector surface,
        a second pipe; and
        a third pipe,
    wherein the reflector surface has a generatrix which is half an ellipse and wherein the second pipe and the third pipe are located at focal points of the ellipse and the first pipe is located on a minor axis of the ellipse at a greater distance from the reflector surface than the second pipe and the third pipe, the first pipe being located at the focal point of a parabola whose vertex coincides with the negative end of the minor axis of the ellipse.

2. The elliptical cylinder collector for thermal solar energy according to claim 1, further comprising:
    two end bars at each end of the reflector surface supporting the first pipe; and
    a secondary bar fixed to each end bar supporting the second pipe and the third pipe.

3. The elliptical cylinder collector for thermal solar energy according to claim 1, wherein the reflector surface comprises reflective material.

4. The elliptical cylinder collector for thermal solar energy according to claim 1, further comprising at least two union elbows joining the pipes together at ends of the same.

5. The elliptical cylinder collector for thermal solar energy according to claim 1, further comprising a static support and an adjustment bolt for adjusting the angle of inclination of the reflector surface.

6. The elliptical cylinder collector for thermal solar energy according to claim 1, further comprising an electronic control system for carrying out the daily solar tracking on an axis.

* * * * *